(12) United States Patent
Hebenstreit

(10) Patent No.: US 10,569,711 B2
(45) Date of Patent: Feb. 25, 2020

(54) MONITORING APPARATUS FOR MONITORING THE OPERATING STATE OF A LASER VEHICLE HEADLAMP

(71) Applicant: ZKW Group GmbH, Wieselburg (AT)

(72) Inventor: Georg Hebenstreit, St. Poelten (AT)

(73) Assignee: ZKW Group GmbH, Wieselburg (AT)

( * ) Notice: Subject to any disclaimer, the term of this patent is extended or adjusted under 35 U.S.C. 154(b) by 1 day.

(21) Appl. No.: 15/769,374

(22) PCT Filed: Sep. 13, 2016

(86) PCT No.: PCT/AT2016/060055
§ 371 (c)(1),
(2) Date: Apr. 19, 2018

(87) PCT Pub. No.: WO2017/066815
PCT Pub. Date: Apr. 27, 2017

(65) Prior Publication Data
US 2018/0304808 A1      Oct. 25, 2018

(30) Foreign Application Priority Data

Oct. 23, 2015  (AT) .................................. 50907/2015

(51) Int. Cl.
*B60Q 11/00* (2006.01)
*F21S 45/70* (2018.01)
(Continued)

(52) U.S. Cl.
CPC ............ *B60Q 11/005* (2013.01); *F21S 41/14* (2018.01); *F21S 41/16* (2018.01); *F21S 41/176* (2018.01); *F21S 45/70* (2018.01)

(58) Field of Classification Search
CPC ....... B60Q 11/005; F21S 45/70; F21S 41/176; F21S 41/14; F21S 41/16
See application file for complete search history.

(56) References Cited

U.S. PATENT DOCUMENTS

2010/0264835 A1  10/2010 Bilenko et al.
2011/0063115 A1   3/2011 Kishimoto
(Continued)

FOREIGN PATENT DOCUMENTS

DE  202010002607 U1  6/2010
DE  102014202294 A1  8/2015
(Continued)

OTHER PUBLICATIONS

DE102014202294 A1 machine translation (Year: 2014).*
(Continued)

*Primary Examiner* — Frederick M Brushaber
(74) *Attorney, Agent, or Firm* — Eversheds Sutherland (US) LLP

(57) ABSTRACT

The invention relates to a monitoring apparatus for monitoring the operating state of a laser vehicle headlamp (4), wherein the laser vehicle headlamp (4) comprises at least one laser light source (5) and a light conversion element (6) that can be illuminated by the laser light source (5) and therefore can be excited to emit visible light, wherein the monitoring apparatus has at least one photosensitive device (3) and one comparison device (1), wherein the photosensitive device (3) comprises at least one LED (D1) that is set up to convert light received from the laser light source (5) into an electrical signal ($U_D$) that is supplied to the comparison device (1), wherein the comparison device (1) is set up to compare the electrical signal ($U_D$) with a preselectable value and to output a fault signal ($U_O$) on the basis of the result of the comparison.

13 Claims, 2 Drawing Sheets

Figure 1:
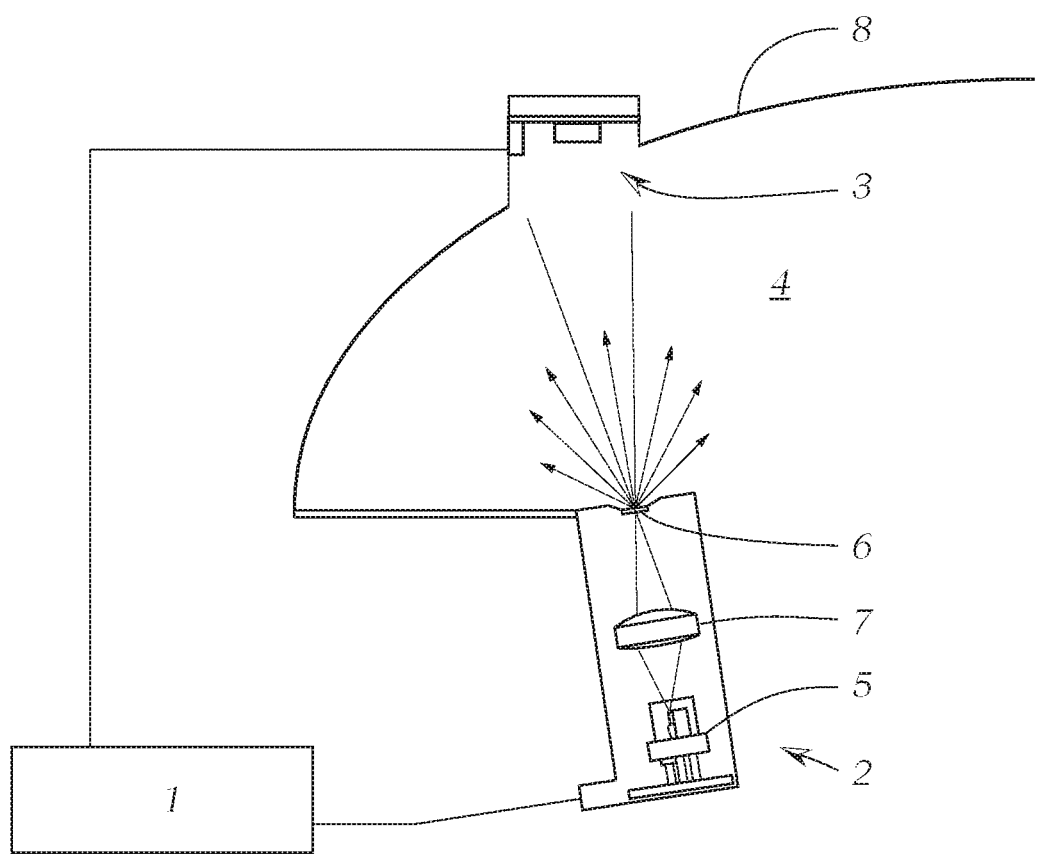

(51) Int. Cl.
  *F21S 41/176* (2018.01)
  *F21S 41/16* (2018.01)
  *F21S 41/14* (2018.01)
  *F21S 41/147* (2018.01)
  *F21S 45/00* (2018.01)

(56) References Cited

U.S. PATENT DOCUMENTS

| | | | | |
|---|---|---|---|---|
| 2011/0280032 | A1* | 11/2011 | Kishimoto | B82Y 20/00 362/538 |
| 2011/0280033 | A1* | 11/2011 | Kishimoto | F21S 41/16 362/543 |
| 2013/0221851 | A1 | 8/2013 | Coates | |
| 2013/0258689 | A1* | 10/2013 | Takahira | F21V 14/00 362/465 |
| 2014/0003074 | A1* | 1/2014 | Kishimoto | C09K 11/0883 362/510 |
| 2014/0268846 | A1* | 9/2014 | Nakazato | B60Q 1/0023 362/510 |
| 2016/0290584 | A1* | 10/2016 | Nomura | H01S 5/005 |
| 2016/0305626 | A1* | 10/2016 | Tatara | F21S 41/14 |
| 2017/0050556 | A1* | 2/2017 | Nakashima | B60Q 1/085 |
| 2017/0267175 | A1 | 9/2017 | Ichikawa | |
| 2018/0094788 | A1* | 4/2018 | Tokida | F21S 43/37 |

FOREIGN PATENT DOCUMENTS

| | | |
|---|---|---|
| EP | 2120511 A1 | 11/2009 |
| JP | H05-083105 A | 4/1993 |
| JP | 2013-168586 A | 8/2013 |
| WO | 2006/019790 A2 | 2/2006 |
| WO | 2008/152922 A1 | 12/2008 |
| WO | 2010/004477 A2 | 1/2010 |
| WO | 2014/072226 A1 | 5/2014 |

OTHER PUBLICATIONS

Search Report issued in Austrian Application No. A 50907/2015, completed Aug. 22, 2016 (1 page).
International Search Report for PCT/AT2016/060055, dated Dec. 19, 2016 (6 pages).
International Preliminary Report on Patentability for PCT/AT2016/060055, dated Feb. 5, 2018 (16 pages).
"LED circuit—Wikipedia", Oct. 16, 2015 (Oct. 16, 2015), URL:https://en.wikipedia.org/w/index.php?title=LEDcircuit&oldid=686073302 [retrieved on Dec. 6, 2016] Paragraph "LED as light sensor".

* cited by examiner

MONITORING APPARATUS FOR MONITORING THE OPERATING STATE OF A LASER VEHICLE HEADLAMP

The invention relates to a monitoring apparatus for monitoring the operating state of an automotive laser headlight, wherein the automotive laser headlight comprises at least one laser light source and one light conversion element that can be illuminated by the laser light source and thereby excited to emit visible light, wherein the monitoring apparatus has at least one photosensitive device and a comparison device.

In addition the invention relates to an automotive laser headlight comprising at least one laser light source and one light conversion element that can be excited to emit visible light, with at least one monitoring apparatus according to the invention and a vehicle, in particular a motor vehicle comprising at least one, preferably two automotive laser headlights according to the invention.

In the operation of automotive laser headlights, it may be necessary for them to be checked for proper functioning in order to prevent dangerous situations from occurring. Such a situation might occur for example if a light conversion element which is set up for converting laser light into visible light is damaged, as a result of which the light conversion takes place incompletely and laser light is emitted by the headlight without being converted. To detect such a defective condition from the state of the art, there are known monitoring apparatuses which have photosensitive devices and photodiodes or phototransistors, with the help of which the spectrum of light emitted by the laser headlight is detected at least partially and by comparison with predetermined target values, the existence of a flawed operating state can be inferred. To ensure a sufficiently sensitive detection of the laser light by the photodiodes and/or phototransistors, optical filters, which are situated upstream from the photodiodes and/or phototransistors and are essentially transparent only in the wavelength range of the laser light and/or the laser light source, are typically used in the state of the art. The sensitivity of the photodiodes and/or phototransistors for detecting the laser light can therefore be increased enough, so that detection of the aforementioned defective conditions is possible.

The use of photodiodes and/or phototransistors with the aid of upstream optical filters constitutes a substantial cost and expense for components in that additional process steps and/or housings and/or additional components are required. Furthermore, faults may also occur in the coordination of the filter and the photodiodes and/or phototransistors.

One object of the present invention is to eliminate the disadvantages mentioned above and to create a monitoring apparatus that will be inexpensive to implement and at the same time will ensure reliable functioning. This object is achieved with a monitoring apparatus of the type defined in the introduction, with which the photosensitive device according to the invention comprises at least one LED (light-emitting diode), which is equipped to convert the light received from the laser light source into an electric signal, which is sent to the comparison device, and the comparison device is equipped to compare the electric signal with a predefinable value and to output a fault signal as a function of the result of the comparison. The predetermined value may be a definable threshold value. Depending on the type of electric signal, this threshold value may be defined as a function of the type of electric signal. For example, the signal of the LED in the correct operating state of the automotive laser headlight may be between 0 and 0.3 V, and in the event of a fault, it may rise above 0.5 V. The threshold value in such a case might be 0.5 V. Use of an LED to detect light emitted by the laser light source, hereinafter also referred to as laser light, has the particular advantage that LEDs, in contrast with photodiodes or phototransistors, have a substantially narrower-band frequency spectrum and thus already have a sufficiently high sensitivity for detecting the respective laser light. The use of additional optical filters may thus be omitted. The monitoring apparatus according to the invention is therefore robust and inexpensive.

The light emitted by the laser light source is preferably blue light in a wavelength range between 420 and 520 nm. Basically, however, the laser light may be of any wavelength suitable for exciting the light conversion element to emit visible light. For example, the laser light may be in a wavelength range between 230 nm (nanometers) and 760 nm, or it may also be outside of the visible range, either above or below the stated wavelength range. The light conversion element may typically be a so-called phosphorus converter (for example, a phosphorus compound or a YAG crystal with cerium doping, etc.).

It is possible in particular to provide that the comparison device comprises a comparator, which is equipped to compare the electric signal with a threshold value and, if a threshold value is exceeded, to output the fault signal.

Furthermore, it is possible to provide that the fault signal is a direct electric signal with a voltage level not equal to 0 V against ground. Therefore, a failure of the power supply of the monitoring apparatus would not necessarily result in output of a fault signal. The concept of "ground" is understood to be a zero potential, i.e., a reference potential on which the signal voltage and operating voltage are based. In the case of a vehicle, the ground potential typically corresponds to the negative pole of the automotive battery, which is usually connected to the vehicle body.

Alternatively, it is possible to provide that the fault signal is a direct electric signal with a voltage level equal to 0 V against ground. It is possible in this way to ensure that a fault signal can be output, despite failure of the power supply of the monitoring device.

It is possible in particular to provide that the photosensitive apparatus has at least one blue LED. A blue LED is understood to be a light-emitting diode equipped for emitting blue light (for example, in the wavelength range between 450 and 500 nm). Blue LEDs are suitable for measuring blue light and have therefore proven to be particularly advantageous when using laser light sources that emit blue light.

It is possible in particular possible to provide that the photosensitive device has at least two LEDs, one of the LEDs being equipped for measuring the laser light and another one of the LEDs being equipped for measuring the remaining light, which is converted by the light conversion element. Using two different light-emitting diodes permits a particularly accurate measurement of the light emitted by the automotive laser headlight. The comparison device preferably receives the signals of all the LEDs and compares them with one or more threshold values, wherein the existence of a fault can be deduced as a function of the result of this comparison.

The term "remaining converted light" is understood to refer to the spectrum of light emitted by the light-conversion element, minus the wave spectrum of the laser light.

It may be particularly advantageous if the spectral sensitivity of the LEDs for measuring the laser light is at its maximum in the wavelength range of the laser light, and the LED for measuring the remaining light converted by the light conversion element has a spectral sensitivity whose maximum is in the wavelength range of visible light minus the wavelength range of the laser light.

It is possible to provide in particular that the LED for measuring the laser light is a blue LED, and the LED for measuring the remaining light converted by the light conversion element is a red LED. A red LED is understood to be a light-emitting diode that is equipped for emitting red light (for example, in the wavelength range between 610 nm and 760 nm). The combination of blue and red LEDs has proven to be particularly advantageous, in particular for monitoring automotive laser headlights having blue laser light diodes because a clear differentiation between the laser light and the converted light is possible by using the signals output by the diodes due to the fact that there is a sufficient distance between the spectral sensitivity of blue and red diodes in the frequency band.

Furthermore, it is possible to provide that the at least two LEDs are switched, so they are antiparallel to one another. Therefore, sufficient protection from electrostatic discharge can be ensured in a simple manner. Furthermore, it is then possible for the light-emitting diodes to block one another as a function of the output signal of the light-emitting diode. For example, it may be advantageous if the blue diode has an output signal at a higher voltage, so that, on activation of both diodes, for example, in a defective condition, in which the light conversion takes place only partially, the blue diode will block the red diode so that a clearly recognizable output signal is output to the comparison device.

In particular it is possible to provide that output signals of the LEDs output as a result of the measurements are sent to the comparison device and are compared with one another by them, and the fault signal is determined by taking into account the output signals. For example, a quotient of the height of the output signal of the blue diode and that of the output signal of the red diode may be used as a parameter that can be cited for comparison with a threshold value. In this way, a false error detection, which might occur, for example, due to a high output signal of the blue LED and the red LED caused by a high total light emission (for example, because of activated remote light or because of activation of a headlight flasher function) can be prevented effectively.

Another aspect of the invention relates to an automotive laser headlight, comprising at least one laser light source and one light conversion element that can be excited to emit visible light, with at least one monitoring apparatus according to the invention, wherein the at least one LED of the photosensitive device is preferably an LED adapted to the spectrum of the laser light source.

A light-emitting diode adapted to the spectrum of the laser light source is understood in particular to be a light-emitting diode that is suitable for detecting the light emitted by the laser light source with a spectral sensitivity that is increased in comparison with that of other wavelength ranges. A blue LED is typically provided for a blue laser light source, but a red LED is provided for a red laser light source, and so forth.

To ensure an automatic shutdown when a faulty state occurs, it is possible to provide that the automotive laser headlight has a control unit connected to the comparison device for controlling the laser light source, wherein the control unit is equipped to deactivate the laser light source on occurrence of the fault signal. With a deactivated laser light source, the light emission is prevented by the laser light source.

In another aspect the invention relates to a vehicle, in particular a motor vehicle, comprising at least one, preferably two, automotive laser headlights according to the invention. The automotive laser headlight, as indicated above, may have a control unit for deactivation of the laser light source. As an alternative to that, this control unit may also be provided in a vehicle and connected to the automotive laser headlight and/or the laser light source.

Figure 2:
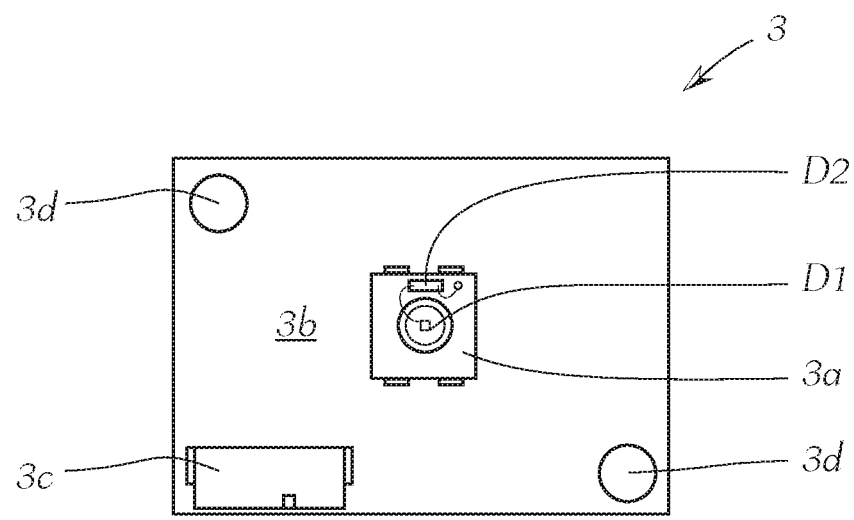
Figure 3:
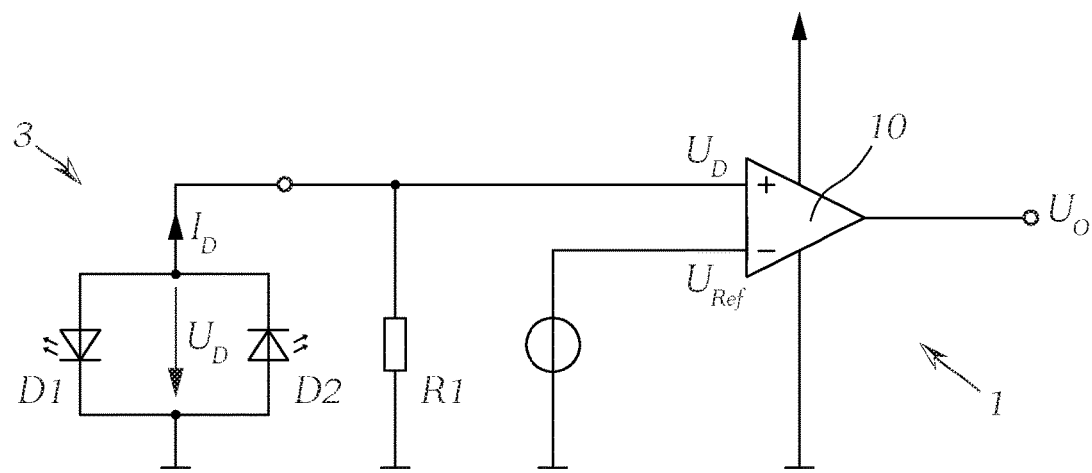
Figure 4:
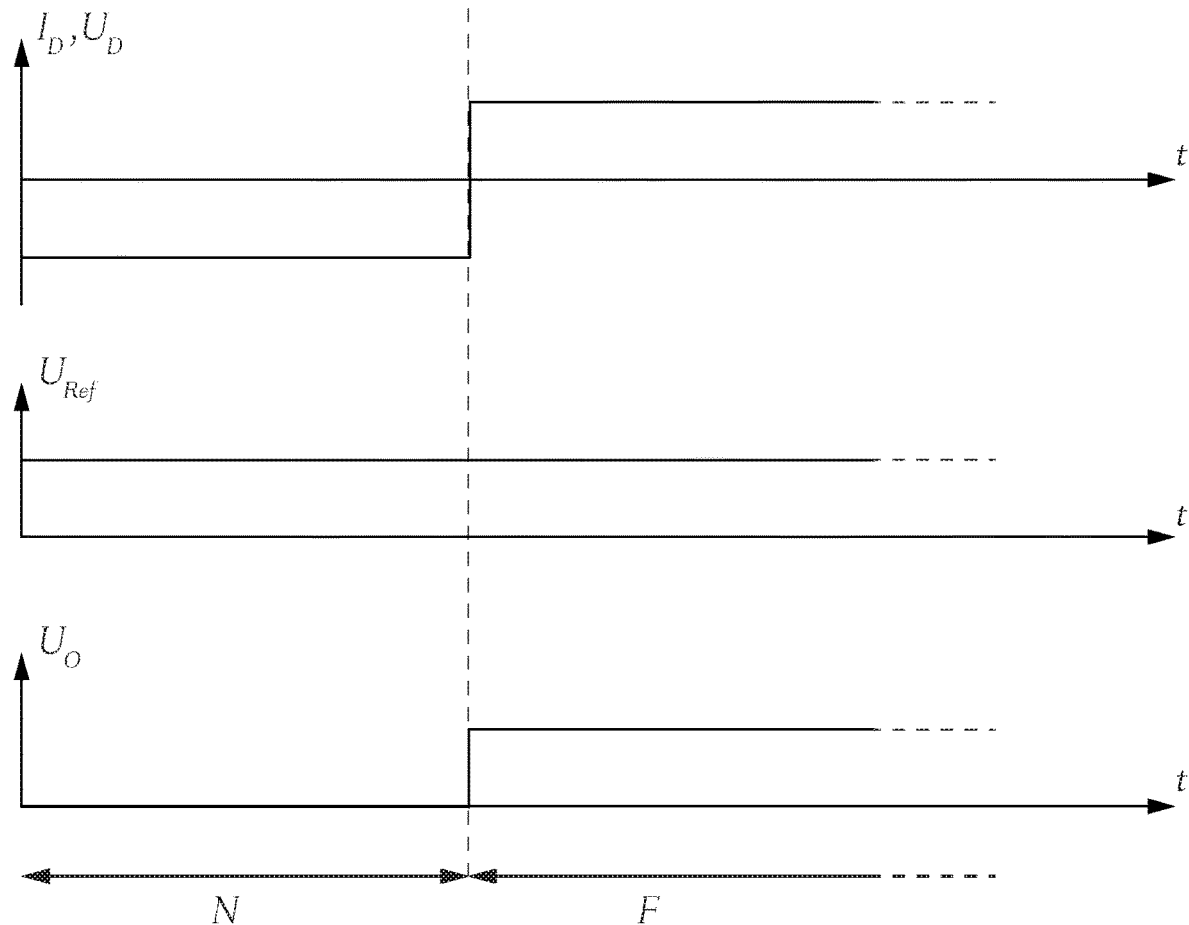

The invention is explained in greater detail below on the basis of an exemplary embodiment, which is illustrated in the figures and is not restrictive. In the drawings:

FIG. 1 shows a schematic diagram of a detail of an automotive laser headlight according to the invention, FIG. 2 shows a schematic diagram of a photosensitive device, FIG. 3 shows an example of an electric circuit of a monitoring apparatus according to the invention, and FIG. 4 shows a plot of electric signals of the monitoring device as a function of time.

Unless otherwise indicated, the same reference numerals in the following figures denote the same features.

FIG. 1 shows a schematic diagram of a detail of an automotive laser headlight 4 according to the invention. The automotive laser headlight 4 in the present exemplary embodiment comprises a laser light source 5, a light conversion element 6, which can be illuminated by the laser light source 5 and can thus be excited to emit visible light, wherein a lens 7 is arranged between the light conversion element 6 and the laser light source 5, a light-sensitive device 3, a reflector 8 and a comparison device 1, which is equipped to compare the electric signal with a predefinable value and to output a fault signal as a function of the result of the comparison.

The laser light source 5, the lens 7 and the light conversion element 6 are combined to form a lighting fixture 2 in the present case which may be embodied as a component installed into a separate housing, for example.

The automotive laser headlight 4 comprises a monitoring apparatus according to the invention, which in turn has the aforementioned photosensitive device 3 and the comparison device 1. The photosensitive device 3 is permanently connected to the reflector 8 and/or accommodated in an opening in the reflector 8, which is preferably arranged in a position in which the laser light source 5 would be illuminated primarily in the absence of the conversion element 6. It is possible in particular to provide that the side of the photosensitive device 3 facing the lighting fixture 2 has a light-absorbent surface to prevent unwanted reflection of laser light in the event of a fault and thus prevent light from escaping from the automotive headlight.

FIG. 2 shows a schematic diagram of the photosensitive device 3. The device 3 has two LEDs, namely one blue LED D1 and one red LED D2, which are arranged in a shared housing 3a in the present exemplary embodiment, but as an alternative, may also be arranged in separate housings. The housing 3a and/or the LEDs D1 and D2 are electrically connected to a printed circuit board 3b, which in the present embodiment has a plug connection 3c for electrical connection to the comparison device 1 and has boreholes 3d for mechanical connection to the reflector 8. The comparison device 1 and/or its electrical implementation may also be arranged directly on the printed circuit board 3b, so that external connecting components such as connecting cables from the photosensitive device 3 to the comparison device 1 may be omitted. The plug connection 3c could then be equipped for direct connection to a control unit in the motor vehicle.

FIG. 3 shows an example of an electric circuit of a monitoring apparatus according to the invention, in which the comparison device 1 comprises a comparator 10, which is equipped to compare the electric signal $U_D$ emitted by the antiparallel circuit of the diodes D1 and D2 with a threshold valued $U_{ref}$ and to deliver a fault signal in the event the threshold value $U_{ref}$ is exceeded, said fault signal being equated with the voltage level $U_0$ in the "high" state in the present example (see FIG. 4). As an alternative to that, the fault signal could also correspond to the "low" state with respect to ground, for example 0 V.

FIG. 4 shows a plot of electric signals of the monitoring device, more specifically the signals $I_D$, $U_D$, $U_{ref}$ and $U_0$ plotted as a function of time. A signal plot of the aforementioned signals in the fault-free state is shown for an initial duration "N." In the following period "F," a malfunction of the automotive laser headlight was detected by the monitoring apparatus on the basis of the threshold value $U_{ref}$ being exceeded, for example, so that the diode current $I_D$ and the output voltage $U_D$ rise and the output signal $U_0$ is switched to the logic state "high" (e.g., 5 V). There is therefore robust and inexpensive detection of fault states.

In view of this teaching, those skilled in the art are able to arrive at other embodiments of the invention, which are not shown here, without making any inventive contribution. Therefore, the invention is not limited to the embodiment shown here. Individual aspects of the invention and/or the embodiment may also be taken up and combined with one another. What is important is the ideas on which the invention is based, which can be implemented by those skilled in the art with knowledge of this description in a variety of ways and nevertheless be upheld as such are essential.

The invention claimed is:

1. A monitoring apparatus for monitoring an operating state of an automotive laser headlight (4), wherein the automotive laser headlight (4) comprises at least one laser light source (5) and a light conversion element (6) that is configured to be illuminated by the at least one laser light source (5) and excited to emit visible light, the monitoring apparatus comprising:
   at least one photosensitive device (3); and
   one comparison device (1),
   wherein the at least one photosensitive device (3) comprises at least one LED (D1), which is configured to convert light received by the at least one laser light source (5) into an electric signal ($U_D$), which is sent to the comparison device (1),
   wherein the comparison device (1) is configured to compare the electric signal ($U_D$) with a preselectable value and to output a fault signal ($U_0$) as a function of a result of the comparison,
   wherein the at least one photosensitive device (3) has at least two LEDs, one of the at least two LEDs being equipped to measure laser light and another one of the at least two LEDs being equipped to measure a remaining light converted by the light conversion element (6), and
   wherein the at least two LEDs are connected antiparallel to one another.

2. The monitoring apparatus according to claim 1, wherein the comparison device (1) comprises a comparator (10), which is configured to compare the electric signal ($U_D$) with a threshold value ($U_{ref}$) and to output the fault signal ($U_0$) on exceeding the threshold value ($U_{ref}$).

3. The monitoring apparatus according to claim 1, wherein the fault signal ($U_0$) is a electric signal having a voltage level not equal to 0 V against ground.

4. The monitoring apparatus according to claim 1, wherein the fault signal ($U_0$) is an electric direct electric signal having a voltage level equal to 0 V against ground.

5. The monitoring apparatus according to claim 1, wherein the at least one photosensitive device (3) has at least one blue LED.

6. The monitoring apparatus according to claim 1, wherein a spectral sensitivity of the at least two LEDs is at a peak for measuring the laser light in a wavelength range of the laser light, and the LED of the at least two LEDs for measuring the remaining light converted by the light conversion element (6) has a spectral sensitivity with a maximum in a wavelength range of the visible light minus the wavelength range of the laser light.

7. The monitoring apparatus according to claim 6, wherein the LED of the at least two LEDs for measuring the laser light is a blue LED, and the LED of the at least two LEDs for measuring the remaining light converted by the light conversion element (6) is a red LED.

8. The monitoring apparatus according to claim 1, wherein output signals of the at least two LEDs, which are output as a result of the measurements, are sent to the comparison device (1) and compared with one another by the comparison device, and the fault signal ($U_0$) is determined by taking into account the output signals.

9. An automotive laser headlight comprising at least one monitoring apparatus according to claim 1.

10. The automotive laser headlight (4) according to claim 9, wherein the at least one LED of the at least one photosensitive device (3) is an LED adapted to a spectrum of the at least one laser light source (5).

11. A motor vehicle comprising at least one automotive laser headlight (4) according to claim 10.

12. The vehicle according to claim 11, wherein the vehicle has a control unit connected to the comparison device (1) for controlling the at least one laser light source (5), wherein the control unit is configured to deactivate the at least one laser light source (5) when the fault signal ($U_0$) occurs.

13. The automotive laser headlight (4) according to claim 9, wherein the automotive laser headlight (4) has a control unit connected to the comparison device (1) for controlling the at least one laser light source (5), wherein the control unit is configured to deactivate the at least one laser light source (5) when the fault signal ($U_0$) occurs.

* * * * *